United States Patent Office 3,496,209
Patented Feb. 17, 1970

3,496,209
ALKYL HALOPYROCARBONATES AND THE PREPARATION THEREOF
Max M. Boudakian, Hamden, Conn., assignor to Olin Mathieson Chemical Corporation, a corporation of Virginia
No Drawing. Filed Jan. 19, 1968, Ser. No. 704,974
Int. Cl. C07c 69/00
U.S. Cl. 260—453                                     9 Claims

ABSTRACT OF THE DISCLOSURE

Alkyl halopyrocarbonates are prepared by the reaction of an excess of a carbonyl halide with an alkali metal or alkaline earth metal alkyl carbonate in the presence of an inert solvent. These alkyl halopyrocarbonates are particularly useful for preparing pyrocarbonate (dicarbonate) esters, known as antibacterial agents.

This invention relates to novel alkyl halopyrocarbonates and to a process for preparing them. The novel halopyrocarbonates are prepared by the reaction of a carbonyl halide with a metal alkyl carbonate according to the following equation:

$$ROCOOM + COX_2 \rightarrow ROCO.O.COX + MX \quad (1)$$

where R is alkyl, M is one equivalent of an alkali metal or alkaline earth metal and X is fluorine, chlorine or bromine.

It is known in U.S. Patent 3,078,294 that pyrocarbonate esters are prepared from phosgene and metal alkyl carbonates according to the equation:

$$2ROCO_2Na + COCl_2 \rightarrow ROCO_2CO_2R + 2NaCl + CO_2 \quad (2)$$

That patent teaches the possible use of an excess of phosgene over the stoichiometric ratio of one mole of phosgene to two moles of carbonate, i.e., 0.5:1. The examples of that patent show ratios from 0.55:1 to 0.66:1. Further, U.S. Patent 3,078,294 warns against the use of more than a slight excess of phosgene since that leads undesirably to the formation of byproduct chloroformate instead of the desired pyrocarbonate ester.

In contrast, the process of the present invention requires the use of phosgene in a ratio of at least 1:1 based on the carbonate and preferably an excess, suitably of 20% or more is used. The molar ratio is preferably from about 1.2:1 to 10:1 or more. The excess phosgene suitably forms, if desired, the inert liquid reaction medium in which the reaction is conducted. It is preferable, however, for economic reasons to use a molar ratio from about 1.2:1 to 2:1.

The process of this invention is preferably conducted at temperatures below 0° C. At higher temperatures some decomposition of the halopyrocarbonates may occur and at 50° C. the decomposition of the desired products is rapid. Temperatures of about −80° C. to 0° C. are preferred. The halopyrocarbonate products are reasonably stable at room temperatures for short periods of time but are stored preferably at lower temperatures.

Carbonyl halides, including phosgene, which are suitable for use in the process of the present invention have the formula COXY where X and Y are halogens independently selected from the group consisting of fluorine, chlorine and bromine. Examples include $COF_2$, $COCl_2$, $COBr_2$ and $COClBr$. Phosgene, $COCl_2$, is preferred for economic reasons.

Any of the alkali metal alkyl carbonates, including potassium, sodium, lithium, rubidium or cesium alkyl carbonates are suitably employed in the process of this invention. Similarly, the alkaline earth metal alkyl carbonates including barium, calcium, strontium, and magnesium alkyl carbonates are suitably employed.

Preferably the alkyl groups have about 1 to 8 carbons. Examples of suitable carbonates include:

Sodium methyl carbonate
Potassium ethyl carbonate
Calcium isopropyl carbonate
Barium sec.-butyl carbonate
Lithium 2-ethylhexyl carbonate Examples of alkyl halopyrocarbonates formed by the process of this invention include, for example:

Methyl chloropyrocarbonate
Ethyl chloropyrocarbonate
Ethyl fluoropyrocarbonate
Ethyl bromopyrocarbonate
Isopropyl chlorocarbonate
Sec.-butyl chloropyrocarbonate
2-ethylhexyl chloropyrocarbonate The process of this invention is suitably carried out between the reactants in the presence of an inert liquid reaction medium. Any solvents or mixture of solvents that are inert to the reactants and product of the process of this invention are suitable inert reaction media. Exemplary solvents include aromatic hydrocarbons, for example, benzene, toluene and xylene; aliphatic hydrocarbons including hexane and petroleum ether; halogenated hydrocarbons including chloroform, methylene chloride, dichloroethylene, carbon tetrachloride and 1,2-dichloroethane; ethers, for example, bis(2-methoxyethyl) ether, di-n-butyl ether, 1,2-dimethoxyethane and other inert solvents including methylal, dioxane, acetonitrile, N,N-dimethylformamide, tetramethylene sulfone and dimethyl sulfoxide. The proportion of inert liquid reaction medium is not critical but conveniently sufficient is used to maintain a reasonably fluid reaction mixture. The order of addition of reagents is not material.

The halopyrocarbonates provided by the present invention are particularly useful for conversion to pyrocarbonate (dicarbonate) esters of reaction with alkali metal carbonates at temperatures above 50° C. up to about 100° C. Many of the pyrocarbonate (dicarbonate) esters are valuable antibacterial agents, having particular effectiveness in beverage applications. Diethyl pyrocarbonate is a well-known agent for the cold sterilization of beverages such as soft drinks, fruit juices, still and sparkling wines, cider and certain beers. Generally, concentrations of 10 to 100 p.p.m. of the pyrocarbonate ester are employed, and the compatibility of these esters with other chemical preservatives enhances their attractiveness in this and other applications. See, for example, U.S. Patents 2,910,400; 2,920,068; 3,186,906; and 3,198,636.

EXAMPLE I

Ethyl chloropyrocarbonate was prepared from phosgene and sodium ethylcarbonate as follows:

Phosgene (2.17 moles) in 1,2-dimethoxyethane (585 ml.) was added during a 30 minute period to a slurry of powdered $C_2H_5OCO_2Na$ (1.43 moles) in 645 ml. of 1,2-dimethoxyethane cooled to −20° C. After stirring for 10.5 hours at this temperature, excess phosgene was flushed with nitrogen, the reaction mixture was filtered and the precipitate was washed with 250 ml. of 1,2-dimethoxyethane and the solvent was removed from the precipitate. The solvent-free filter cake contained 1.5 gram atoms of Cl⁻ (100% conversion).

The combined filtrate and washings was concentrated by evaporation at −23° C. under a pressure of 0.8 mm. Hg. Distillation of the residual liquor provided a center fraction of ethyl chloropyrocarbonate boiling at 37° C./ 4.7 mm., $n_D^{25}$ 1.4003.

*Analysis.*—Calc. for $C_4H_5O_4Cl$ (152.5): C, 31.49; H, 3.28; Cl, 23.24. Found: C, 31.22; H, 3.40; Cl, 23.30.

Mass spectral analysis showed two fragments, corresponding to $C_2H_5OCOCl$ and $CO_2$, respectively. The IR spectrum provided a doublet at 5.4 and 5.6μ respectively, indicative of multiple carbonyl groups found in linear anhydrides and a band at 14.3μ indicative of a —CCl group. Another IR band characteristic of ethyl chloropyrocarbonate appeared at 11.1μ.

EXAMPLE II

Ethyl chloropyrocarbonate was prepared from phosgene and potassium ethylcarbonate as follows:

Phosgene (0.63 mole) dissolved in 1,2-dimethoxyethane (110 ml.) was added during a 10 minute period to a mixture of (0.44 gram mole) $C_2H_5OCO_2K$ and 1,2-dimethoxyethane (425 ml.) cooled to −10°. The reaction mixture was stirred at −10° to −20° for 7.5 hours. The system was purged with $N_2$ to remove excess phosgene. The inorganic solids were filtered and washed with 50 ml. of 1,2-dimethoxyethane. Analysis of the filter cake showed 0.412 gram atom of chloride ion corresponding to 92.7% conversion.

The filtrate was concentrated at −23° C. under 0.25 mm. Hg pressure. Fractionation of the residual liquor provided a center fraction, boiling at 31.5° C. at 4.7 mm. and having $n_D^{26}$ 1.3990. This ethyl chloropyrocarbonate had an IR spectrum similar to that of the product of Example I.

*Analysis.*—Calc. for $C_4H_5O_4Cl$ (152.5): C, 31.49; H, 3.28; Cl, 23.24. Found: C, 31.50; H, 3.59; Cl, 22.52.

EXAMPLE III

Ethyl chloropyrocarbonate was converted to diethyl pyrocarbonate as follows:

A mixture of ethyl chloropyrocarbonate (12.05 g.; 0.079 mole), potassium carbonate (5.46 g.; 0.0395 mole) and 1,2 - dimethoxyethane (275 ml.; redistilled from $CaH_2$) was stirred successively at different temperatures without any change in the IR spectrum; −23° C. (3 hours); 0° C. (8 hours); and 25° C. (6.5 hours). At 50° (19 hours), significant $CO_2$ evolution (0.0313 mole) occurred. The characteristic IR band of

$C_2H_5O.CO.O.COCl$ at 11.1 μ disappeared, as well as shifting of the doublet in the linear anhydride region from 5.4 and 5.6 to 5.5 and 5.7μ.

The volatile components were removed at −23° C. at 1 mm. The residual liquid had an IR spectrum corresponding to that of diethyl pyrocarbonate and had $n_D^{25}$ 1.3907 corresponding to the literature value of $n_D^{25}$ 1.3975.

What is claimed is:

1. A halopyrocarbonate having the formula

RO.CO.O.COX where R is alkyl of 1 to 8 carbons and X is fluorine, chlorine or bromine.

2. Ethyl halopyrocarbonates as claimed in claim 1 where R is ethyl.

3. Alkyl chloropyrocarbonates as claimed in claim 1 where X is chlorine.

4. Ethyl chloropyrocarbonate.

5. Method of preparing a halopyrocarbonate as claimed in claim 1 by reacting at from −80° to 0° C. in an inert liquid reaction medium a metal alkyl carbonate with a carbonyl halide of the formula COXY where X and Y are halogens independently selected from the group consisting of fluorine, chlorine and bromine, said metal being selected from the group consisting of alkali metals and alkaline earth metals to form a reaction mixture containing said halopyrocarbonate and separating said halopyrocarbonate from said reaction mixture, the molar ratio of said carbonyl halide to said carbonate being at least 1:1.

6. The method of claim 5 in which said carbonyl halide is phosgene.

7. The method of claim 5 in which said molar ratio is from 1.2:1 to 2:1.

8. The method of claim 5 in which said carbonate is sodium ethyl carbonate.

9. The method of claim 5 in which said carbonate is potassium ethyl carbonate.

References Cited

UNITED STATES PATENTS 3,078,294    2/1963    Howe et al.

FOREIGN PATENTS 1,009,302    11/1965    Great Britain.

CHARLES B. PARKER, Primary Examiner

S. T. LAWRENCE III, Assistant Examiner

U.S. Cl. X.R.

99—156, 224; 260—999